United States Patent [19]

Jensen

[11] Patent Number: 4,498,916
[45] Date of Patent: Feb. 12, 1985

[54] CONTROL OF A FRACTIONAL DISTILLATION PROCESS

[75] Inventor: Bruce A. Jensen, Bartlesville, Okla.

[73] Assignee: Phillips Petroleum Company, Bartlesville, Okla.

[21] Appl. No.: 508,638

[22] Filed: Jun. 28, 1983

[51] Int. Cl.³ .............................. B01D 3/42; F25J 3/02
[52] U.S. Cl. ............................................ 62/21; 62/37; 364/501
[58] Field of Search ...................... 364/501; 62/21, 37; 203/1-3, DIG. 18; 202/206, 160; 208/DIG. 1

[56] References Cited

U.S. PATENT DOCUMENTS 3,115,445  12/1963  Kleiss et al. ...................... 202/160
3,268,420  8/1966  Webber et al. .................... 203/2
3,803,002  4/1974  Skraba et al. ..................... 203/1

*Primary Examiner*—Frank Sever
*Attorney, Agent, or Firm*—French and Doescher

[57] ABSTRACT

In a fractional distillation process in which both a heating fluid and a waste heat stream are utilized to supply heat to the fractional distillation process, the heat input to the fractional distillation process is controlled by scaling the output of the heat controller so that such output is representative of the percentage of the total heat available which should be supplied to the fractional distillation column to maintain a desired heat input to the fractional distillation column. The set point for the flow of both the heating fluid and the waste heat stream are then derived based on the output of the heat controller which allows control of heat input to the fractional distillation process and also provides a situation where the heat controller output may be linear which makes tuning the heat controller easier and improves stability of the heat controller.

10 Claims, 3 Drawing Figures

CONTROL OF A FRACTIONAL DISTILLATION PROCESS

This invention relates to control of a fractional distillation process having plural heat inputs. In one aspect, this invention relates to method and apparatus for maintaining a desired heat input to a fractional distillation process having plural heat inputs, wherein the heating fluids used to supply such plural heat inputs are different.

Fractional distillation columns are employed in many chemical manufacturing processes to make desired separations. Typically, a feed stream containing at least first and second components is supplied to the fractional distillation column. A substantial portion of the first component contained in the feed stream is removed from the fractional distillation column as an overhead product and a substantial portion of the second component in the feed stream is removed from the fractional distillation process as a bottoms product. Heat is generally supplied to the fractional distillation column in order to affect the desired separation.

Heat is typically supplied to a fractional distillation column by either recycling a portion of the bottoms product through a reboiler to which a heating fluid such as steam is passed or by passing the heating fluid directly through the liquid in a lower portion of the fractional distillation column. However, as the cost of energy have increased, it is becoming more and more important to minimize the use of the heating fluid so as to maintain the economic viability of the distillation process.

One method for minimizing the use of a heating fluid such as steam or hot oil is to recover waste heat from other available process streams. Since any particular chemical manufacturing or separation process will typically employ a number of distillation columns and other process equipment, streams from these associated distillation columns or other process equipment, the heat in which would normally not be utilized, can be passed through a heat exchanger through which liquid from the bottom of the fractional distillation column is passed or can be passed through the liquid in the fractional distillation column to supply heat to the fractional distillation column. In some cases, this can even result in improved economics for the process with which the waste heat supplying stream is associated since it may be necessary to cool the waste heat supplying stream.

As used herein, the term "heating fluid" will be used to refer to a fluid such as steam or hot oil which is supplied to a reboiler or circulated through the liquid in the fractional distillation column. The term "waste heat stream" will be used to refer to the fluid stream which is used to supply waste heat to the fractional distillation column.

In almost all fractional distillation processes, it is important to maintain a desired heat input to the fractional distillation column so as to maintain desired product qualities, prevent flooding, etc. Where only a single heating fluid is being utilized to supply heat to the fractional distillation column, a typical method for controlling the heat input to the fractional distillation column is to determine the total heat input required to maintain the desired product composition or other desired process variable associated with the fractional distillation process. This desired total heat input is compared to the actual heat being supplied to the fractional distillation column by the one heating fluid and this comparison is utilized to manipulate the flow of the heating fluid so as to maintain the actual heat input substantially equal to the desired total heat input.

It is difficult to apply the above described typical control where the heating fluid and a waste heat stream are being utilized to supply heat to a fractional distillation column. Many times the heating fluid and waste heat stream will be controlled by different types of valves (gas is normally controlled by a ball or butterfly valve while a liquid is normally controlled by a gate or globe valve). Also, the heating fluid and waste heat stream will typically have different characteristics and will supply heat at different rates through the valve ranges. Thus, tuning of the controller which compares the actual heat input to the total desired heat input becomes virtually impossible since, if the controller is tuned for the characteristics of the heating fluid and the valve controlling the flow of the heating fluid, the controller will be untuned and unstable with respect to the waste heat stream.

It is thus an object of this invention to provide method and apparatus for maintaining a desired heat input to a fractional distillation process having plural heat inputs, wherein the plural heat inputs are provided by heating fluids having different characteristics.

In accordance with the present invention, control of the total heat input to a fractional distillation process which has plural heat inputs in response to the output of a single heat controller is accomplished by the scaling the output of the heat controller so as to be representative of the percentage of the total heat available which should be supplied to the fractional distillation column so as to maintain a desired heat input to the fractional distillation column. A set point for the heating fluid flow is then derived based on the controller output, the ratio of the actual flow rate of the waste heat stream to the maximum possible flow rate of the waste heat stream and the percentage of the total heat which is supplied by the heating fluid and the waste heat stream respectively. In like manner, a set point for the flow rate of the waste heat stream is derived based on the same controller output, the ratio of the actual heating fluid flow rate to the maximum possible heating fluid flow rate and, again, the percentage of the total heat which can be supplied by the heating fluid and waste heat stream respectively. Thus, two set points are derived from the output from a single heat controller which allows control of the heat input to a fractional distillation process which has multiple heat inputs and also provides a situation where the heat controller output may be linear which makes tuning of the heat controller easier and improves stability of the heat controller.

Other objects and advantages of the invention will be apparent from the foregoing brief description of the invention and the claims as well as the detailed description of the drawings which are briefly described as follows:

The invention is illustrated and described in terms of a specific fractional distillation process which is directed to separating methane from natural gas. However, the invention is applicable to any fractional distillation process which employs a plurality of heat inputs.

Also, the invention is illustrated and described in terms of a fractional distillation process in which the heating fluid and waste heat stream are supplied to a reboiler. As has been previously stated, either of these streams could be circulated through the liquid in the bottom of the fractional distillation column if desired. In both cases, the fluids are generally referred to as being supplied to the fractional distillation column since the reboiler is generally considered a part of the fractional distillation column.

Figure 1:
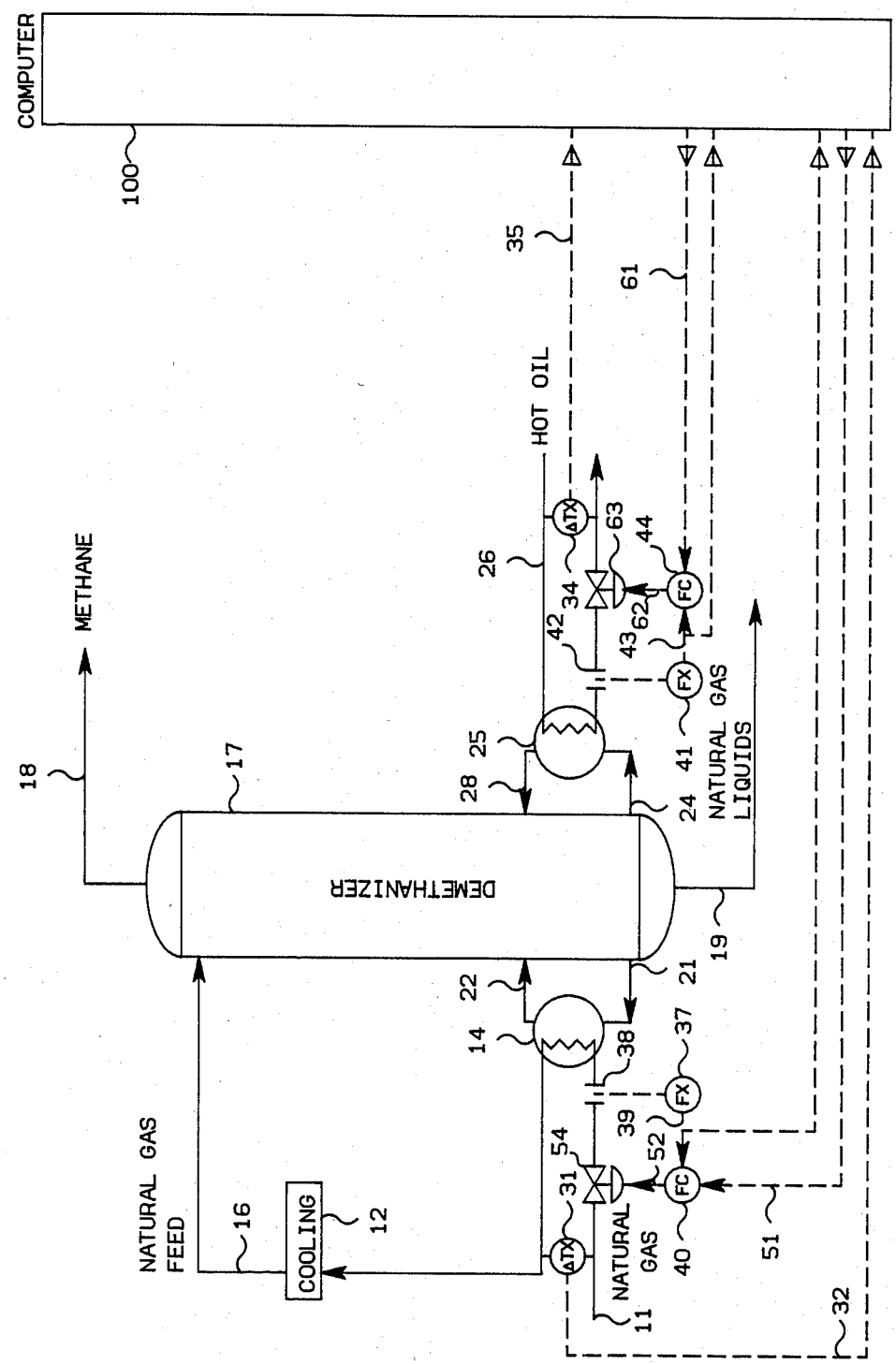
FIG. 1 is a diagramatic illustration of a demethanizing process which has plural heat inputs and the associated control system of the present invention.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by the controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, natural gas at high pressure (generally about 500 psia) is supplied through conduit means 11 to the cooling system 12. The natural gas flowing through conduit means 11 is passed in heat exchange with the fluid contained in the reboiler 14.

The cooling system 12 is conventional. Such a cooling system will generally consist of expansion and using propane for cooling. The thus cooled natural gas feed is supplied from the cooling system 12 through conduit means 16 to the demethanizer column 17. The natural gas feed flowing through conduit means 16 will typically have a temperature about −170° F.

Methane is separated from the natural gas feed in the demethanizer 17. Such separated methane is withdrawn through conduit means 18. A bottoms product which is generally referred to as natural gas liquids is withdrawn from the demethanizer 17 through conduit means 19.

Liquid from the bottom of the demethanizer 17 is withdrawn through conduit means 21 and is provided to the reboiler 14. As has been previously stated, such fluid is passed in heat exchange with the natural gas flowing through conduit means 11 and is recirculated to the demethanizer 17 through conduit means 22.

In like manner, liquid from the bottom of the demethanizer 17 is withdrawn through conduit means 24 and is provided to the reboiler 25. Such liquid is passed in heat exchange with hot oil which is provided to the reboiler 25 through conduit means 26 and is then recirculated to the demethanizer 17 through conduit means 28.

It is noted that the natural gas flowing through conduit means 11 will typically have a temperature of about 20° F. While such a fluid would generally not be considered a heating fluid, this is a "hot" temperature with respect to the temperature in the demethanizer. In like manner, the hot oil flowing through conduit means 26 would typically have a temperature of about 400° F. which would generally not be considered hot except with respect to the temperature in the demethanizer column 17.

Since energy is required to heat the hot oil, the hot oil would generally be referred to as the heating fluid as previously described. The natural gas stream flowing through conduit means 11 would be considered the waste heat stream. It is noted that other heating fluids such as steam could be utilized. Also, other process streams could be utilized as the waste heat stream.

The manner in which the various process variables required for calculation of the control signals are measured and the results provided to the computer is as follows:

The differential temperature transducer 31 in combination with temperature sensing devices such as thermocouples, which are operably located on both the inlet and outlet sides of the reboiler 14, provides an output signal 32 which is representative of the difference in the temperature of the natural gas stream flowing to the reboiler 14 and the natural gas stream withdrawn from the reboiler 14. Signal 32 is provided from the differential temperature transducer 31 as an input to computer 100.

In like manner, the differential temperature transducer 34 in combination with temperature sensing devices such as thermocouples, which are operably located on both the hot oil inlet and hot oil outlet sides of the reboiler 25, provides an output signal 35 which is representative of the difference in the temperature of the hot oil flowing to the reboiler 25 and the temperature of the hot oil withdrawn from the reboiler 25. Signal 35 is provided from the differential temperature transducer 34 as an input to computer 100.

Flow transducer 37 in combination with the flow sensor 38, which is operably located in conduit means 11, provides an output signal 39 which is representative of the actual flow rate of the natural gas stream through conduit means 11. Signal 39 is provided as the process variable input to the flow controller 40 and is also provided as an input to computer 100.

In like manner, flow transducer 41 in combination with the flow sensor 42, which is operably located in conduit means 26, provides an output signal 43 which is representative of the actual flow rate of the hot oil through conduit means 26. Signal 43 is provided from the flow transducer 41 as the process variable input to the flow controller 44 and is also provided as an input to computer 100.

In response to the described process variable measurements, two set point signals are generated by computer 100. Set point signal 51 is representative of the desired flow rate of the natural gas flowing through conduit means 11. Signal 51 is provided from computer 100 as the set point input to the flow controller 40.

In response to signals 39 and 51, the flow controller 40 provides an output signal 52 which is responsive to the difference between signals 39 and 51. Signal 52 is scaled so as to be representative of the position of the control valve 54, which is operably located in conduit means 11, required to maintain the actual flow rate of the natural gas through conduit means 11 substantially equal to the desired flow rate represented by signal 51. Signal 52 is provided from the flow controller 40 as the control signal for the control valve 54 and the control valve 54 is manipulated in response thereto.

Set point signal 61 is representative of the desired flow rate of the hot oil through conduit means 26. Signal 61 is provided from computer 100 as the set point signal to the flow controller 44.

In response to signals 43 and 61, the flow controller 44 provides an output signal 62 which is responsive to the difference between signals 43 and 61. Signal 62 is scaled so as to be representative of the position of the control valve 63, which is operably located in conduit means 26, required to maintain the actual flow rate of the hot oil flowing through conduit means 26 substantially equal to the desired flow rate represented by signal 61. Signal 62 is provided from the flow controller 44 as a control signal for the control valve 63 and the control valve 63 is manipulated in response thereto.

As has been previously stated, it is desirable to use the waste heat stream (natural gas) to the maximum extent possible. Thus, the preferred control in accordance with the present invention completely opens control valve 54 before control valve 63 begins to open. However, this is not required and, if desired, control valve 63 could be opened before control valve 54 is completely opened.

Figure 2:
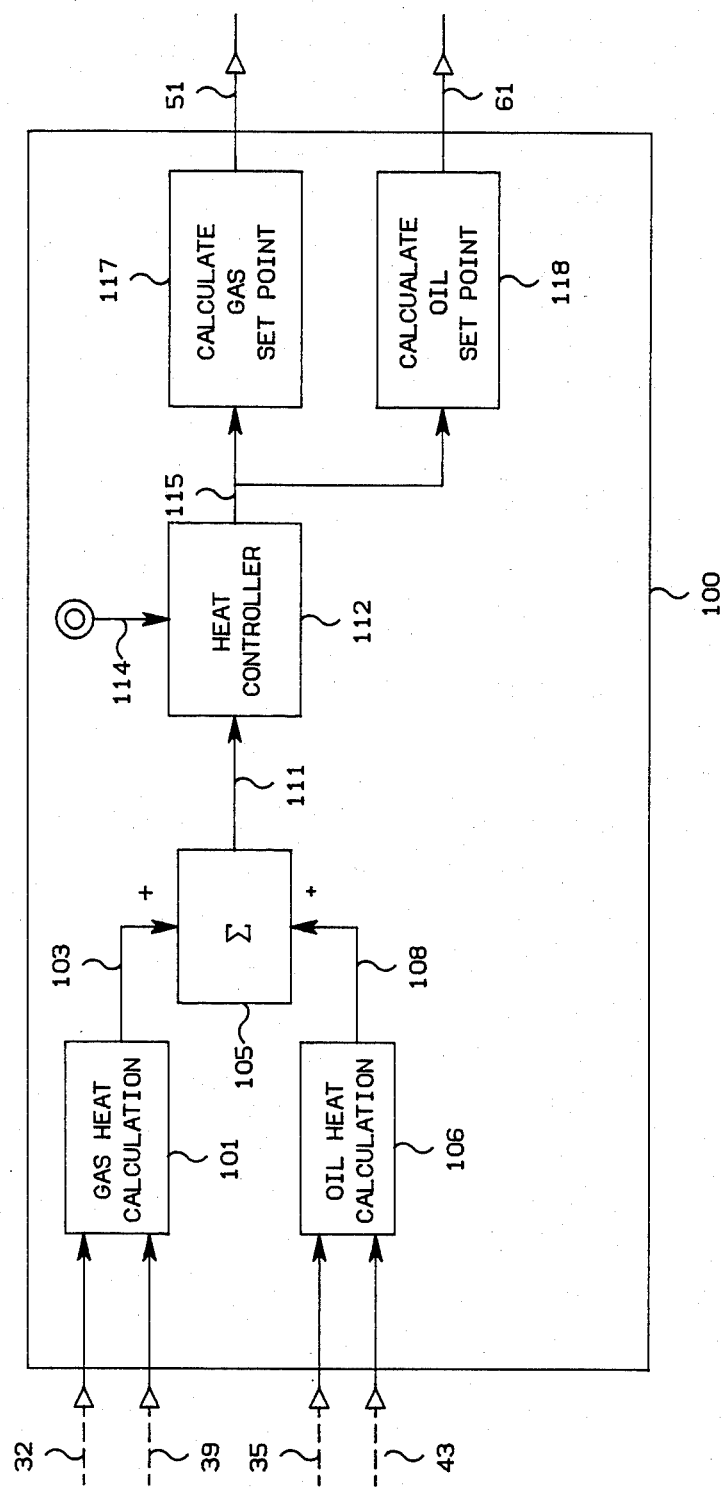
FIG. 2 is a logic diagram of the computer logic utilized to generate the set point signals required for control of the two heat inputs illustrated in FIG. 1 based on the process measurements illustrated in FIG. 1.

Referring now to FIG. 2, signal 32, which is representative of the difference in the temperature of the natural gas provided to the reboiler 14 and the temperature of the natural gas withdrawn from the reboiler 14, is provided as an input to the gas heat calculation block 101. In like manner, signal 39, which is representative of the actual flow rate of the natural gas flowing through conduit means 11, is provided as an input to the gas heat calculation block 101.

The amount of heat supplied to the reboiler by the natural gas (Gas Heat) is calculated in the gas heat calculation block 101 in accordance with equation (1)

$$\text{Gas Heat} = F_G C_{PG} \Delta T_G \tag{1}$$

where
$F_G$ = flow rate of the natural gas through conduit means 11 (signal 39);
$C_{PG}$ = specific heat of the natural gas flowing through conduit means 11; and
$\Delta T$ = difference between the temperature of the natural gas provided to the reboiler 14 and the temperature of the natural gas withdrawn from the reboiler 14 (signal 32).

The specific heat of the natural gas flowing through conduit means 11 will generally be known based on laboratory analysis. Signal 103, which is representative of the actual heat being supplied to the reboiler 14 by the natural gas flowing through conduit means 11 is provided from the gas heat calculation block 101 as a first input to the summing block 105.

Signal 35, which is representative of the difference in the temperature of the hot oil provided to the reboiler 25 and the temperature of the hot oil withdrawn from the reboiler 25 is provided as a first input to the oil heat calculation block 106. In like manner, signal 43, which is representative of the actual flow rate of the hot oil through conduit means 26, is provided as a second input to the oil heat calculation block 106. The heat actually being supplied to the reboiler 25 by the hot oil (Oil Heat) is calculated in the oil heat calculation block 106 in the same manner as previously described for the calculation of gas heat in accordance with equation (2)

$$\text{Oil Heat} = F_O C_{PO} \Delta T_O \quad (2)$$

where $F_O$ = signal 43;
$\Delta T_O$ = signal 35; and
$C_{PO}$ = the specific heat of the hot oil flowing through conduit means 26.

Again, the specific heat of the hot oil flowing through conduit means 26 will generally be known from laboratory analysis. Signal 108 which is representative of oil heat is provided from the oil heat calculation block 106 as a second input to the summing block 105.

Signals 103 and 108 are summed in the summing block 105 to establish signal 111 which is representative of the total actual heat being supplied to the demethanizer 17. Signal 111 is provided from the summing block 105 as the process variable input to the heat controller 112.

The heat controller 112 is also provided with a set point signal 114 which is representative of the desired total heat input for the demethanizer column 17. Signal 114 could be established in a number of different manners depending on the particular fractional distillation process. However, since establishing the total heat required by a fractional distillation is conventional and does not play any part in the description of the present invention, the various methods for establishing the total heat required by a fractional distillation column are not described herein for the sake of simplicity.

In response to signals 111 and 114, the heat controller 112 provides an output signal 115 which is representative of the percentage of the total heat available which should be supplied to the demethanizer column 17 in order to maintain the actual total heat supplied to the demethanizer column 17 substantially equal to the desired total heat input represented by signal 114. Signal 115 is provided from the heat controller block 112 as an input to the calculate gas set point block 117 and as an input to the calculate oil set point block 118.

The manner in which the set point for the flow rate of the natural gas conduit means 11 is calculated in the calculate gas set point block 117 is as follows:

The total heat which can be supplied to the demethanizer column 17 when control valve 54 and control valve 63 are fully opened (Total Heat Full Scale) is given by equation 3

$$\frac{\text{Total Heat}}{\text{Full Scale}} = \frac{\text{Gas Heat}}{\text{Full Scale}} + \frac{\text{Oil Heat}}{\text{Full Scale}} \quad (3)$$

where

Gas Heat Full Scale = the total heat which can be supplied by the natural gas flowing through conduit means 11 when control valve 54 is fully open; and Oil Heat Full Scale = the total heat which can be supplied by the hot oil flowing through conduit means 26 when control valve 63 is fully open.

The fraction (X) of the Total Heat Full Scale which can be supplied by the natural gas flowing through conduit means 11 is given by equation 4

$$X = \frac{\text{Gas Heat Full Scale}}{\text{Total Heat Full Scale}} \quad (4)$$

In like manner, the fraction (Y) of the Total Heat Full Scale which can be supplied by the hot oil flowing through conduit means 26 is given by equation 5

$$Y = \frac{\text{Oil Heat Full Scale}}{\text{Total Heat Full Scale}} \quad (5)$$

The set point for the flow rate of the natural gas ($G_{SP}$) is given by equation (6)

$$G_{SP} = \left[ \left( \text{Signal 115} - \frac{F_O}{F_{OM}} * Y \right) / X \right] F_{GM} \quad (6)$$

where $F_{GM}$ = the flow rate of the natural gas through conduit means 11 when control valve 54 is fully open;
$F_{OM}$ = the flow rate of the hot oil through conduit means 26 when control valve 63 is fully opened; and
signal 115, $F_O$, Y and X are as previously defined.

Signal 51, which is representative of $G_{SP}$, is provided as an output signal from computer 100 and is utilized as has been previously described.

The set point for the hot oil flow rate through conduit means 26 ($O_{SP}$) is calculated in the calculate oil set point block 118 in accordance with equation (7)

$$O_{SP} = \left[ \left( \text{Signal 115} - \frac{F_G}{F_{GM}} * X \right) / Y \right] F_{OM} \quad (7)$$

where signal 115, $F_G$, $F_{GM}$, $F_{OM}$, X and Y are as previously defined. Signal 61, which is representative of $O_{SP}$, is provided as an output from computer 100 and is utilized as has been previously described.

As an example of the calculation of $G_{SP}$ and $O_{SP}$, consider a situation in which the percentage of the total heat full scale which can be supplied by the natural gas flowing through conduit means 11 is 25%. Thus, X = 0.25 and Y = 0.75. Also, assume that 50% of the Total Heat Full Scale needs to be supplied to the demethanizer and that the output of the heat controller (signal 115) is 50%. Under these circumstances, $F_G$ will equal $F_{GM}$ since more heat is demanded than can be supplied by the natural gas and thus the term $F_G/F_{GM}$ in equation (7) will be equal to 1. Thus, equation (7) reduces to equation (8) which shows that signal 61 will have a magnitude equal to 33% of $F_{OM}$. Under the same circumstances, $G_{SP}$ will be 100% of $F_{GM}$.

$$O_{SP} = [(0.50 - 1*0.25)/0.75] F_{OM} = 0.33 F_{OM} \quad (8)$$

Figure 3:
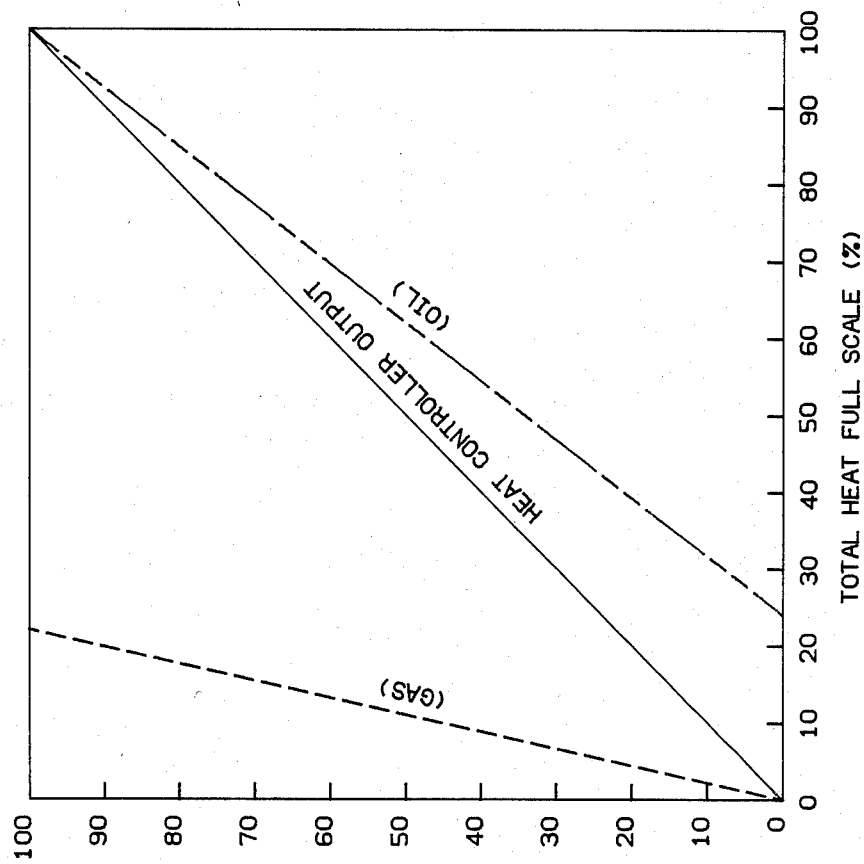
FIG. 3 is a graphical representation of the relationship of the heat controller output and the bracketed portions of Equations 6 and 7.

FIG. 3 is provided to further illustrate the calculation of $G_{SP}$ and $O_{SP}$. FIG. 3 illustrates the relationship between the output from the heat controller (signal 115) and the bracketed portions of equations (6) and (7)

([GAS] and [OIL] respectively). FIG. 3 clearly illustrates the linear nature of the heat controller output and also illustrates the magnitude of the bracketed portion of equations (6) and (7) as the heat controller output changes. FIG. 3 also illustrates the manner in which the total heat available from the natural gas is preferably utilized before any heat available from the hot oil is utilized.

The invention has been described in terms of a preferred embodiment as illustrated in FIGS. 1, 2 and 3. Specific components used in the practice of the invention as illustrated in FIG. 1 such as differential temperature transducers 32 and 34; flow controllers 40 and 44, flow transducers 37 and 41, flow sensors 38 and 42, and control valves 54 and 63 are each well known, commercially available control components such as are described at length in Perry's Chemical Engineers Handbook, 4th Edition, Chapter 22, McGraw-Hill.

For reasons of brevity, conventional auxiliary fractionation equipment such as pumps, other heat exchangers, additional measurement-control devices, etc. have not been included in the above description as they play no part in the explanation of the invention.

While the invention has been described in terms of the presently preferred embodiment, reasonable variations and modifications are possible by those skilled in the art and such variations and modifications are within the scope of the described invention and the appended claims.

That which is claimed is:

1. Apparatus comprising:
   a fractional distillation column;
   means for supplying a heating fluid stream through a first control valve to said fractional distillation column;
   means for supplying a waste heat stream through a second control valve to said fractional distillation column;
   means for establishing a first signal representative of the actual flow rate of said waste heat stream;
   means for establishing a second signal representative of the difference in the temperature of the waste heat stream provided to said fractional distillation column and the waste heat stream after said waste heat stream has provided heat to said fractional distillation column;
   means for establishing a third signal representative of the actual flow rate of said heating fluid stream;
   means for establishing a fourth signal representative of the difference in the temperature of the heating fluid provided to said fractional distillation column and the heating fluid after said heating fluid stream has provided heat to said fractional distillation column;
   means for establishing a fifth signal representative of the total actual heat being provided to said fractional distillation column by said heating fluid stream and said waste heat stream in response to said first, second, third and fourth signals;
   means for establishing a sixth signal representative of the total heat input required by said fractional distillation column;
   means for comparing said fifth signal and said sixth signal and for establishing a seventh signal (C) which is responsive to the difference between said fifth and said sixth signal, wherein said seventh signal is scaled so as to be representative of the percentage of the heat, which could be supplied to said fractional distillation column if said first control valve and said second control valve were fully open, required to maintain the actual total heat supplied to said fractional distillation column substantially equal to the total heat represented by said sixth signal;
   means for establishing an eighth signal representative of a desired flow rate of said waste heat stream in response to said seventh signal;
   means for manipulating said second control valve in response to said eighth signal;
   means for establishing a ninth signal representative of the desired flow rate of said heating fluid stream in response to said seventh signal; and
   means for manipulating said first control valve in response to said ninth signal, wherein the manipulation of said first control valve in response to said ninth signal and the manipulation of said second control valve in response to said eighth signal results in the total heat actually supplied to said fractional distillation column being substantially equal to the desired total heat represented by said sixth signal.

2. Apparatus in accordance with claim 1 wherein said means for establishing said fifth signal in response to said first, second, third and fourth signals comprises:
   means for establishing a tenth signal representative of the specific heat of said waste heat stream;
   means for multiplying said first signal, said second signal, and said tenth signal to establish an eleventh signal representative of the total heat actually being supplied to said fractional distillation column by said waste heat stream;
   means for establishing a twelfth signal representative of the specific heat of said heating fluid stream;
   means for multiplying said third signal, said fourth signal and said twelfth signal to establish a thirteenth signal representative of the actual total heat being supplied to said fractional distillation column by said heating fluid stream; and
   means for adding said eleventh signal and said thirteenth signal to establish said fifth signal.

3. Apparatus in accordance with claim 2 wherein said means for establishing said eighth signal in response to said seventh signal comprises:
   means for establishing a fourteenth signal representative of the total heat which could be supplied to said fractional distillation column if said first control and said second control valve were fully open;
   means for establishing a fifteenth signal representative of the total heat which could be supplied to said fractional distillation by said waste heat stream if said second control valve were fully open;
   means for establishing a sixteenth signal representative of the total heat which could be supplied by said heating fluid stream to said fractional distillation column if said first control valve were fully open;
   means for dividing said fifteenth signal by said fourteenth signal to establish a seventeenth signal representative of the percentage of said fourteenth signal which could be supplied to said fractional distillation column by said waste heat stream (X);
   means for dividing said sixteenth signal by said fourteenth signal to establish an eighteenth signal representative of the percentage of the heat represented by said fourteenth signal which could be supplied to said fractional distillation column by said heating fluid stream (Y);

means for establishing a nineteenth signal representative of the flow rate of said heating fluid stream when said first control valve is fully open ($F_{OM}$);

means for establishing a twentieth signal representative of the flow rate of said waste heat stream when said second control valve is fully open ($F_{GM}$);

means for dividing said third signal by said nineteenth signal to establish a twenty-first signal representative of $F_O/F_{OM}$;

means for multiplying said twenty-first signal by eighteenth signal to establish a twenty-second signal representative of $F_O/F_M*Y$;

means for subtracting said twenty-second signal from said seventh signal to establish a twenty-third signal representative of $C-F_O/F_{OM}*Y$;

means for dividing said twenty-third signal by said seventeenth signal to establish a twenty-fourth signal representative of $(C-F_O/F_{OM}*Y)/X$; and means for multiplying said twenty-fourth signal by said twentieth signal to establish said eighth signal.

4. Apparatus in accordance with claim 3 wherein said means for establishing said ninth in response to said seventh signal comprises:

means for dividing said first signal by said twentieth signal to establish a twenty-fifth signal representative of $F_G/F_{GM}$;

means for multiplying said twenty-fifth signal by said seventeenth signal to establish a twenty-sixth signal representative of $F_G/F_{GM}*X$;

means for subtracting said twenty-sixth signal from said seventh signal to establish a twenty-seventh signal representative of $C-F_G/F_{GM}*X$;

means for dividing said twenty-seventh signal by said eighteenth signal to establish a twenty-eighth signal representative of $(C-F_G/F_{GM}*X)/Y$; and means for multiplying said twenty-eighth signal by said nineteenth signal to establish said ninth signal.

5. Apparatus in accordance with claim 4 wherein said means for manipulating said second control valve in response to said eighth signal and said means for manipulating said first control valve in response to said ninth signal comprises:

means for establishing a twenty-ninth signal representative of the actual flow rate of said waste heat stream;

means for comparing said eighth signal and said twenty-ninth signal and for establishing a thirtieth signal which is responsive to the difference between said eighth signal and said twenty-ninth signal, wherein said thirtieth signal is scaled so as to be representative of the position of said second control valve required to maintain the actual flow rate of said waste heat stream substantially equal to the desired flow rate represented by eighth signal;

means for manipulating said second control valve in response to said thirtieth signal;

means for establishing a thirty-first signal representative of the actual flow rate of said heating fluid stream;

means for comparing said thirty-first signal and said ninth signal and for establishing a thirty-second signal which is responsive to the difference between said ninth signal and said thirty-first signal, wherein said thirty-second signal is scaled so as to be representative of the position of said first control valve required to maintain the actual flow rate of said heating fluid stream substantially equal to the desired flow rate represented by said ninth signal; and means for manipulating said first control valve in response to said thirty-second signal.

6. A method for controlling the heat supplied to a fractional distillation column, wherein a heating fluid stream is supplied through a first control valve to said fractional distillation column and a waste heat stream is supplied through a second control valve to said fractional distillation column, said method comprising the steps of:

establishing a first signal representative of the actual flow rate of said waste heat stream;

establishing a second signal representative of the difference in the temperature of the waste heat stream provided to said fractional distillation column and the waste heat stream after said waste heat stream has provided heat to said fractional distillation column;

establishing a third signal representative of the actual flow rate of said heating fluid stream;

establishing a fourth signal representative of the difference in the temperature of the heating fluid provided to said fractional distillation column and the heating fluid after said heating fluid stream has provided heat to said fractional distillation column;

using computing means to establish a fifth signal representative of the total actual heat being provided to said fractional distillation column by said heating fluid stream and said waste heat stream in response to said first, second, third and fourth signals;

using computing means to establish a sixth signal representative of the total heat input required by said fractional distillation column;

using computing means to compare said fifth signal and said sixth signal and to establish a seventh signal (C) which is responsive to the difference between said fifth and said sixth signal, wherein said seventh signal is scaled so as to be representative of the percentage of the heat, which could be supplied to said fractional distillation column if said first control valve and said second control valve were fully open, required to maintain the actual total heat supplied to said fractional distillation column substantially equal to the total heat represented by said sixth signal;

using computing means to establish an eighth signal representative of a desired flow rate of said waste heat stream in response to said seventh signal;

manipulating said second control valve in response to said eighth signal;

using computing means to establish a ninth signal representative of the desired flow rate of said heating fluid stream in response to said seventh signal; and manipulating said first control valve in response to said ninth signal, wherein the manipulation of said first control valve in response to said ninth signal and the manipulation of said second control valve in response to said eighth signal results in the total heat actually supplied to said fractional distillation column being substantially equal to the desired total heat represented by said sixth signal.

7. A method in accordance with claim 6 wherein said step of using computing means to establish said fifth signal in response to said first, second, third and fourth signals comprises:

establishing a tenth signal representative of the specific heat of said waste heat stream;

using computing means to multiply said first signal, said second signal, and said tenth signal to establish an eleventh signal representative of the total heat actually being supplied to said fractional distillation column by said waste heat stream;

establishing a twelfth signal representative of the specific heat of said heating fluid stream;

using computing means to multiply said third signal, said fourth signal and said twelfth signal to establish a thirteenth signal representative of the actual total heat being supplied to said fractional distillation column by said heating fluid stream; and using computing means to add said eleventh signal and said thirteenth signal to establish said fifth signal.

8. A method in accordance with claim 7 wherein said step of using computing means to establish said eighth signal in response to said seventh signal comprises:

using computing means to establish a fourteenth signal representative of the total heat which could be supplied to said fractional distillation column if said first control and said second control valve were fully open;

using computing means to establish a fifteenth signal representative of the total heat which could be supplied to said fractional distillation by said waste heat stream if said second control valve were fully open;

using computing means to establish a sixteenth signal representative of the total heat which could be supplied by said heating fluid stream to said fractional distillation column if said first control valve were fully open;

using computing means to divide said fifteenth signal by said fourteenth signal to establish a seventeenth signal representative of the percentage of said fourteenth signal which could be supplied to said fractional distillation column by said waste heat stream (X);

using computing means to divide said sixteenth signal by said fourteenth signal to establish an eighteenth signal representative of the percentage of the heat represented by said fourteenth signal which could be supplied to said fractional distillation column by said heating fluid stream (Y);

establishing a nineteenth signal representative of the flow rate of said heating fluid stream when said first control valve is fully open ($F_{OM}$);

establishing a twentieth signal representative of the flow rate of said waste heat stream when said second control valve is fully open ($F_{GM}$);

using computing means to divide said third signal by said nineteenth signal to establish a twenty-first signal representative of $F_O/F_{OM}$;

using computing means to multiply said twenty-first signal by eighteenth signal to establish a twenty-second signal representative of $F_O/F_M*Y$;

using computing means to subtract said twenty-second signal from said seventh signal to establish a twenty-third signal representative of $C-F_O/F_{OM}*Y$;

using computing means to divide said twenty-third signal by said seventeenth signal to establish a twenty-fourth signal representative of $(C-F_O/F_{OM}*Y)/X$; and using computing means to multiply said twenty-fourth signal by said twentieth signal to establish said eighth signal.

9. A method in accordance with claim 8 wherein said step of using computing means to establish said ninth in response to said seventh signal comprises:

using computing means to divide said first signal by said twentieth signal to establish a twenty-fifth signal representative of $F_G/F_{GM}$;

using computing means to multiply said twenty-fifth signal by said seventeenth signal to establish a twenty-sixth signal representative of $F_G/F_{GM}*X$;

using computing means to subtract said twenty-sixth signal from said seventh signal to establish a twenty-seventh signal representative of $C-F_G/F_{GM}*X$;

using computing means to divide said twenty-seventh signal by said eighteenth signal to establish a twenty-eighth signal representative of $(C-F_G/F_{GM}*X)/Y$; and using computing means to multiply said twenty-eighth signal by said nineteenth signal to establish said ninth signal.

10. A method in accordance with claim 9 wherein said step of manipulating said second control valve in response to said eighth signal and said step of manipulating said first control valve in response to said ninth signal comprises:

establishing a twenty-ninth signal representative of the actual flow rate of said waste heat stream;

using computing means to compare said eighth signal and said twenty-ninth signal and to establish a thirtieth signal which is responsive to the difference between said eighth signal and said twenty-ninth signal, wherein said thirtieth signal is scaled so as to be representative of the position of said second control valve required to maintain the actual flow rate of said waste heat stream substantially equal to the desired flow rate represented by eighth signal;

manipulating said second control valve in response to said thirtieth signal;

establishing a thirty-first signal representative of the actual flow rate of said heating fluid stream;

using computing means to compare said thirty-first signal and said ninth signal and to establish a thirty-second signal which is responsive to the difference between said ninth signal and said thirty-first signal, wherein said thirty-second signal is scaled so as to be representative of the position of said first control valve required to maintain the actual flow rate of said heating fluid stream substantially equal to the desired flow rate represented by said ninth signal; and manipulating said first control valve in response to said thirty-second signal.

* * * * *